(12) United States Patent
Kimura et al.

(10) Patent No.: US 6,902,065 B2
(45) Date of Patent: Jun. 7, 2005

(54) METHOD FOR SEPARATION OF PLASTIC MIXTURES BASED ON MAGNETO-ARCHIMEDES LEVITATION

(75) Inventors: Tsunehisa Kimura, Hachioji (JP);
Shogo Mamada, Hachioji (JP);
Masafumi Yamato, Hachioji (JP);
Koichi Kitazawa, Tokyo (JP)

(73) Assignee: Japan Society for the Promotion of Science, Tokyo (JP)

( * ) Notice: Subject to any disclaimer, the term of this patent is extended or adjusted under 35 U.S.C. 154(b) by 301 days.

(21) Appl. No.: 09/933,823

(22) Filed: Aug. 22, 2001

(65) Prior Publication Data

US 2002/0153295 A1 Oct. 24, 2002

(30) Foreign Application Priority Data

Aug. 23, 2000 (JP) .................................... 2000-252696

(51) Int. Cl.[7] ............................................... B03C 1/32
(52) U.S. Cl. ..................... 209/39; 209/214; 209/232
(58) Field of Search .......................... 209/39, 213, 214, 209/226, 227, 231, 232, 636

(56) References Cited

U.S. PATENT DOCUMENTS

| | | |
|---|---|---|
| 3,483,969 A | 12/1969 | Rosensweig |
| 3,788,465 A * | 1/1974 | Reimers et al. ........... 209/39 X |
| 4,187,170 A | 2/1980 | Westcott et al. |
| 4,347,124 A | 8/1982 | Shimoiizaka et al. |
| 4,809,854 A * | 3/1989 | Tomaszek ................. 209/39 X |
| 5,957,298 A * | 9/1999 | Buske et al. ............ 209/232 X |

FOREIGN PATENT DOCUMENTS

SU           1184565         * 10/1985   ................. 209/232

OTHER PUBLICATIONS

Tsunehisa Kimura et al., "Separation of Solid Polymers by Magneto–Archimedes Levitation," The Chemical Society of Japan, Jul. 25, 2000, pp. 1294–1295.

E. Beaugnon et al., "Levitation of organic materials," Nature, vol. 349, Feb. 7, 1991, p. 470.

Yasuhiro Ikezoe et al., "Making water levitate," Nature, vol. 393, Jun. 25, 1998, pp. 749–750.

* cited by examiner

*Primary Examiner*—Donald P. Walsh
*Assistant Examiner*—Joseph C Rodriguez
(74) *Attorney, Agent, or Firm*—Burns, Doane, Swecker & Mathis, LLP

(57) ABSTRACT

Under a magnetic field gradient, solid particles floating and/or sinking in a supporting liquid (most suitably a paramagnetic one) are levitated or anti-levitated at different locations depending on their densities and diamagnetic susceptibilities.

2 Claims, 3 Drawing Sheets

METHOD FOR SEPARATION OF PLASTIC MIXTURES BASED ON MAGNETO-ARCHIMEDES LEVITATION

BACKGROUND OF THE INVENTION (1). Field of the Invention

The present invention concerns a method for separation of solid plastic mixtures based on magneto-Archimedes levitation.

(2). Related Art Statement

There have been already several reports on the diamagnetic magnetic levitation (E. Beaugnon and R. Tournier, Nature, vol. 349, p 470, 1991, etc.). It is known that water droplets and plastic particles are magnetically levitated in the air. In addition, it is reported that if a pressurized paramagnetic gas (e.g. oxygen gas) is used for a suspending medium, the diamagnetic levitation is possible in a moderate magnetic field, and even paramagnetic materials may be levitated (Ikezoe et al., Nature, vol. 393, p 749, 1998). This phenomenon is called magneto-Archimedes levitation. In magneto-Archimedes levitation, the gravitational force and the magnetic force exerted directly on a suspended substance are balanced with the buoyancy and the magnetic force exerted by the paramagnetic suspending medium through the surface of the substance. Namely, (1) gravitational force, (2) buoyancy, (3) magnetic force acting on the suspended substance; and (4) magnetic buoyancy caused by the suspending medium.

Separation is necessary for recycling or dumping of the discarded plastics with small environmental loads. For this purpose, there have been so far proposed separation methods including a method in which spectrum patterns of plastics are analyzed at a high speed. Separation of powder in a high-pressure oxygen gas using the magneto-Archimedes effect has also been reported.

However, the conventional methods were insufficient to deal with a large amount of used plastics at a high speed and a low cost.

The inventors have found that various kinds of plastics can levitate at different locations in paramagnetic supporting liquid in balance with the gravitation and magnetic forces due to the difference in their magnetic susceptibilities and densities. In addition, this finding is easily applied to a continuous separation process.

SUMMARY OF THE INVENTION

That is, the present invention relates to a method for separating different kinds of solid plastic particles in a solid plastic mixture, said method comprising the steps of preparing a solid plastic mixture comprising plural kinds of diamagnetic solid plastic particles, floating, suspending or precipitating said solid plastic particles in a supporting liquid, applying a magnetic field gradient to the solid plastic mixture, and leviating or anti-leviating said plastic particles at different locations in the supporting liquid under a magnetic field gradient, depending upon their densities and diamagnetic susceptibilities.

Preferred conditions for carrying out the proposed process are as follows:

(1) The supporting liquid is paramagnetic.

(2) Aqueous solutions of paramagnetic inorganic salts are used as the supporting liquid. Paramagnetic liquids make the levitation possible under relatively weak magnetic fields. Moreover, most aqueous solutions of inorganic salts do not dissolve the plastics, and they are inexpensive.

In most cases, the supporting liquid is paramagnetic, whereas the plastic particles are diamagnetic. However, any combinations of the supporting liquids and the plastic particles are possible theoretically. Even if both the supporting liquid and the plastic particles are diamagnetic, separation is possible, if a strong magnetic field is used.

(3) The separation is continuously carried out, if the supporting liquid is continuously flown. By doing so, a large amount of discarded plastics can be appropriately dealt with.

BRIEF DESCRIPTION OF THE DRAWINGS

For a better understanding of the invention, reference is made to the attached drawings, wherein.

DETAILED DESCRIPTION OF THE INVENTION

Four forces are acting on a solid plastic material suspended in a supporting liquid medium under a magnetic field: (1) gravitational force, (2) buoyancy, (3) magnetic force directly acting upon the solid plastic material, and (4) magnetic buoyancy acting upon the material from the supporting liquid (Trans. MRS-J, 24 [1]77 (2000)). The solid plastic material stays at a location where these forces are in balance. This is attained under the condition:

$$B\frac{dB}{dz} = \mu_0 g \Delta \frac{\rho}{\Delta_\chi} \qquad (1)$$

where g is the acceleration of gravity, $\mu_0$ is the magnetic permeability of vacuum, B is the magnetic flux density, z is the vertical coordinate with respect to the center of the magnetic field (z=0), and z>0 and z<0 denote the upper and lower sides with respect to the center of the field, respectively.

The difference in densities between each of the solid plastics and the supporting liquid and that in the magnetic susceptibilities between them are defined:

$$\Delta\rho = \rho_1 - \rho_2$$

$$\Delta\chi = \chi_1 - \chi_2 \qquad (2a)$$

where $\rho_1$ and $\rho_2$ are density of the solid plastic component and that of the supporting liquid, respectively, and $\chi_1$ and $\chi_2$ are the magnetic susceptibilities. Since the supporting liquid under consideration is paramagnetic, whereas the plastics are diamagnetic, then $\chi_1<0$, $\chi_2>0$, and hence, $\Delta\chi<0$.

Figure 1A:
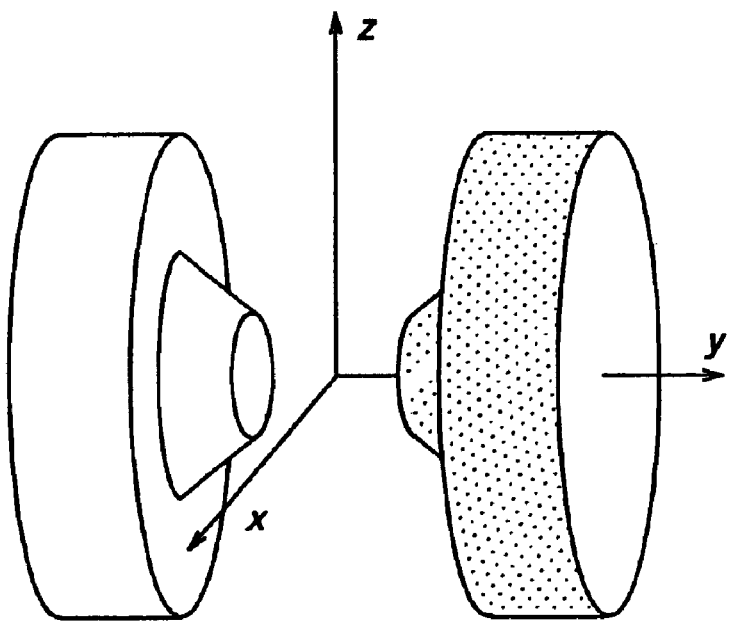
FIG. 1(a) is an electromagnet used in the present invention.
Figure 1B:
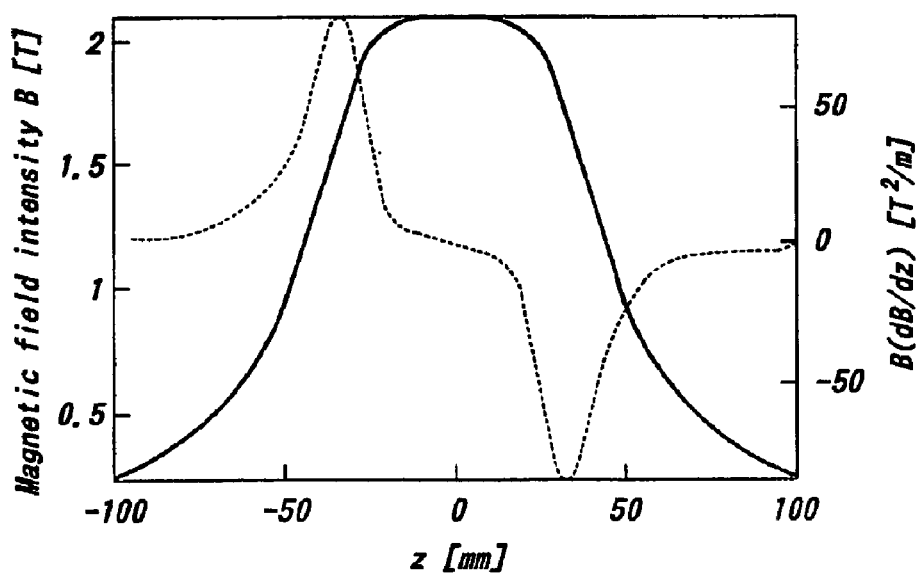
FIG. 1(b) shows the magnetic flux density B and the quantity BdB/dz plotted against the vertical coordinate z with respect to the center of the magnetic field taken as z=0.

FIG. 1(a) shows the schematic diagram of the electromagnet used, and FIG. 1(b) shows the magnetic flux density B and the quantity BdB/dz plotted against the vertical coordinate z with the center of the magnetic field taken as the origin. The electromagnet used (Tamagawa Manufacturing Co., Ltd.) generates a horizontal magnetic field. The field gradient generated above and below the magnetic center (2.1 T) was used. In FIG. 1(b), the vertical position is measured with respect to the magnetic field center (z=0) which is located between the two pole pieces. The quantity BdB/dz (displayed by dotted line in the figure) was calculated numerically using the B data (shown by solid line) provided by the manufacturer.

Figure 2:
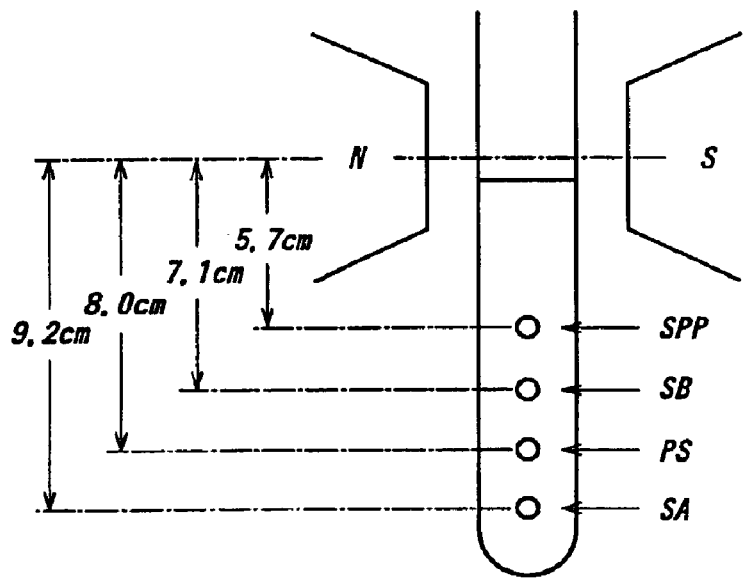
FIG. 2 schematically shows a result of separation of syndiotactic poly(propylene) (SPP), styrene-butadiene copolymer (SB), poly(styrene) (PS) and styrene-acrylonitrile copolymer (SA) suspended in an aqueous solution of manganese chloride.

FIG. 2 schematically shows the result of the separation. Pellets of syndiotactic polypropylene (sPP) manufactured by Mitsui Chemical Co., Ltd., styrene-butadiene copolymer (SB), polystyrene (PS) styrene-acrylonitrile copolymer (SA) manufactured by Asahi Kasei Co., Ltd. (each having a diameter of about 5 mm) floating on the surface of the supporting liquid (manganese chloride aqueous solution, about 11 wt %) in a 2 cm-diameter test tube were pushed into the liquid and stayed in the respective locations (anti-levitation) when the test tube was brought to the center of the magnetic field from below the center. The separation was attained almost instantly. The quantity BdB/dz is negative and positive, respectively, at the regions above and below the magnetic field center. If $\Delta\rho>0$, the balance is attained above the field center, while if $\Delta\rho<0$, to the contrary, the balance is attained below the center. A stable balance is impossible if $|BdB/dz|<|\mu_o g\Delta\rho/\Delta\chi|$. It is clear from equation (1) that the smaller is the change in BdB/dz outside the minimum point of BdB/dz, the larger becomes the separation between two particles.

The following is the detail description of the present invention.

(1) Supporting Liquid

The paramagnetic liquids used for the supporting liquid should not dissolve the plastics. Aqueous solution of paramagnetic inorganic salts would suffice this condition. For example, manganese chloride, manganese sulfate, iron chloride, iron sulfate, gadolinium chloride, etc. may be used. Parainagnetic inorganic salts having a large paramagnetic susceptibility are appropriate in view of washing after separation and the field strength required. Because the magnetic susceptibility of dilute paramagnetic inorganic salt aqueous solutions is approximately proportional to the concentration, solutions prepared with salts having a large magnetic susceptibility are suitable for the use at a low concentration. The optimum concentration is determined by the spatial resolution desired. The spatial resolution depends on the magnetic susceptibility and the density of the plastic, and those of the aqueous solution, along with the profile of BdB/dz of the magnet used.

Among the aqueous solutions, one prepared with manganese chloride is suited because this solution exhibits large paramagnetic magnetic susceptibility at a low concentration. Under the field strength provided by the electromagnet used, the concentrations ranging 1 to 10 wt % are most suited. If the concentration is too low, the magnetic force becomes insufficient. On the other hand, if the concentration is too high, the density of the supporting liquid becomes so high that most plastic components come to float. As a result, the buoyancy acting upon the plastics becomes to overwhelm the magnetic force, leading to the lack in field strength.

(2) Plastics

The plastics to be separated by the present invention include most of commercially used plastics, such as polyethylene, polyethylene terephthalate, polypropylene, polystyrene, polyacrylonitrile, nylon, polymethyl methacrylate, and many others.

The separation process is applied successfully to plastics in a form of pellets. If the pulverized plastics of micron size are used, a longer time is elapsed before the separation is completed because the particles move more slowly if their size is small. In addition, the spatial resolution is low for small particles. If the plastics are treated in the form of bottles, the separation may be incomplete because of the air trapped inside. The size of the plastics to be treated should be in the range of a few millimeters to several centimeters. Discarded plastics of an arbitrary size and kinds may be milled to an appropriate size (pellet size) without preliminary classification, then subjected to the separation by the method proposed in the present invention.

Manganese chloride, manganese sulfate, iron chloride, iron sulfate, and gadolinium chloride could be used to prepare paramagnetic aqueous solutions. The concentration of the solution may be appropriately adjusted depending upon the magnetic field gradient used, etc. Plastics with $\rho_1<\rho_2$ are separated below the center of the magnetic field, while those with $\rho_1<\rho_2$ are separated above the center of the magnetic field. This separation method is also applied to the mixture containing plastics with $\rho_1$s both larger and smaller than the density $\rho_2$ of the supporting liquid.

The volume fraction of plastics should not be too high because plastic particles prevent each other from being separated smoothly. It should be up to 50 volume %, preferably less than 20 volume %.

(3) Magnetic gradient

Magnetic gradients are generated by permanent magnets, electro-magnets, and superconducting magnets. The direction of the magnetic field may be vertical or horizontal, but it is preferable that there should be a stable levitating point with respect to the horizontal direction, in addition to the vertical direction. In order to obtain a high spatial resolution, the second derivative of $B^2$ with respect to the vertical direction z should be smaller.

(4) Separation method

According to the present invention, solid plastics are levitated at different locations depending on their densities and diamagnetic susceptibilities. Separated particles are collected by a batch method or a continuous method.

The separation described above can be carried out most effectively under a continuous process in which the supporting liquid are circulated continuously. The detail is described below.

Figure 4:
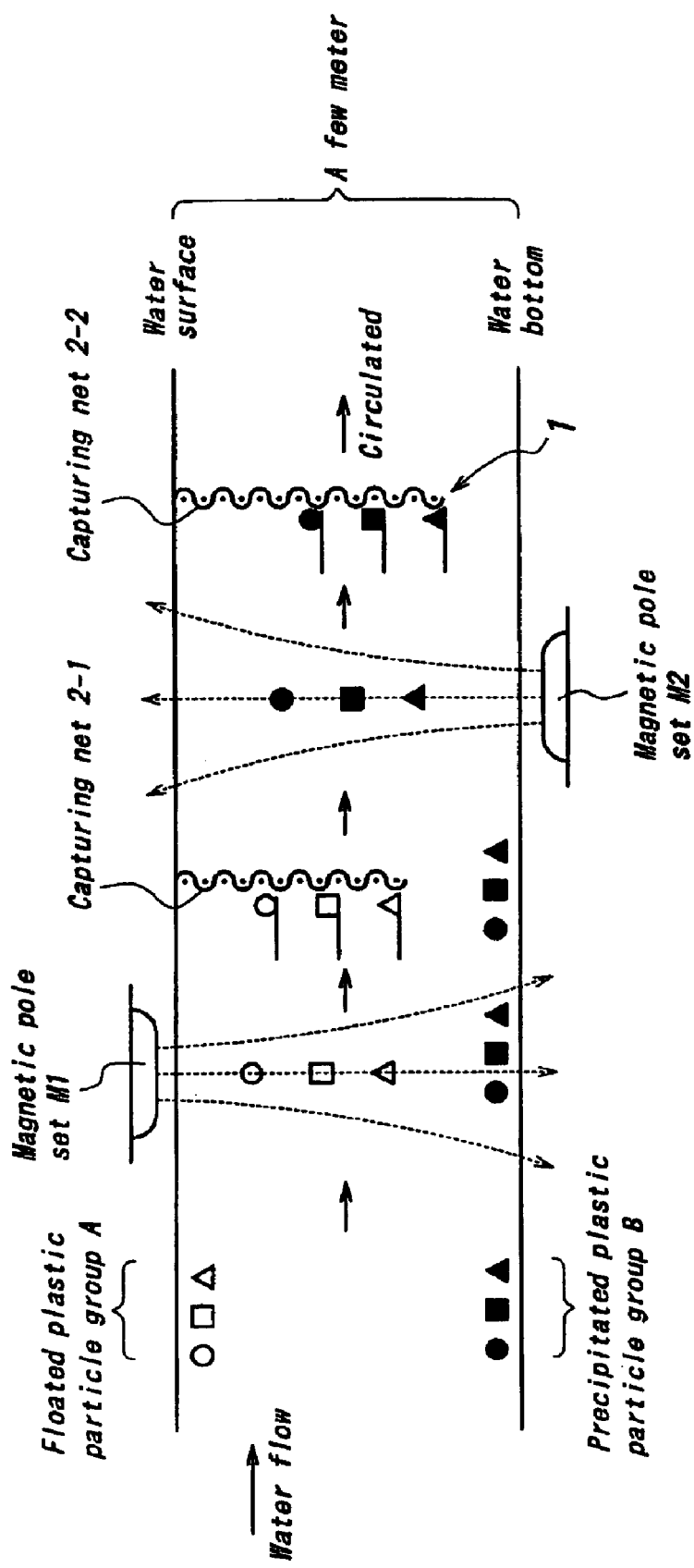
FIG. 4 schematically illustrates a continuous method of separation based on the present invention.

A continuous process is shown in FIG. 4. Plastics are fed into a flow of supporting fluid circulating in a channel. In FIG. 4, the circulating fluid flows from left to right. The plastics that were fed are separated into group A (floating) and group B (sinking) depending on their densities. Then, a magnetic field gradient is applied to the plastics from upward, pushing the floating plastics into the fluid and making them anti-levitated at different locations depending on the kinds of the plastics. Then, the separated plastics are collected by a capturing net (2-1). During this process, plastics belonging to the group B go on moving at the bottom of the channel. Consecutively, a magnetic field gradient is applied to these plastics from downward, pushing these sinking plastics into the fluid and making them levitated at different locations depending on the kinds of the plastics. Then, the separated plastics are collected by a capturing net (2—2). The level and quality of the supporting fluid is maintained by adding additional suspending liquid.

EXAMPLES

In the following, the present invention will be explained in more detail by some examples. These are merely examples representing the present invention, and they never limit the scope of the invention.

Example 1
Particles are Anti-Levitated Below the Center of the Magnetic Field Pellets (syndiotactic poly(propylene) (sPP), styrene-butadiene block copolymer (SB), poly(styrene) (PS)) were suspended in an aqueous solution of manganese chloride ($\rho_2$=1.098 g/cm$^3$, $\chi_2$=1.7×10$^{-4}$) filled in a test tube of diameter of 2 cm. The size of each pellet was ca. 5×5×5 mm$^3$. Since the densities of these pellets were lower than that of the suspending solution, they were floating on the surface of the solution in the beginning. Then, when the test tube was moved from below the magnetic center, each pellet was pushed downward, anti-levitating at different locations as shown in FIG. 2.

Example 2
Particles are Levitated Above the Center of the Magnetic Field

Figure 3:
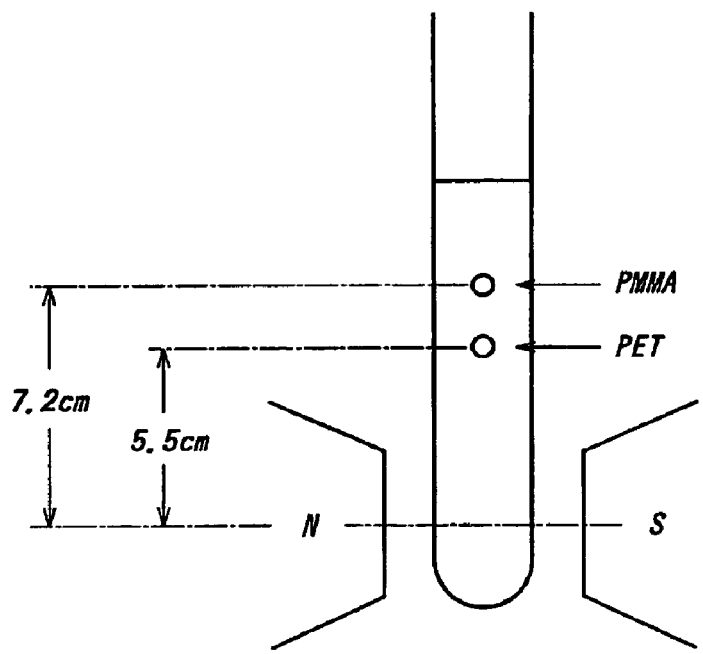
FIG. 3 schematically shows a result of separation of poly(methyl methacrylate) and poly(ethylene terephthalate) pellets suspended in an aqueous solution of manganese chloride.

Pellets (poly(methyl methacrylate) (PMMA) and poly(ethylene terephthalate) (PET)) were suspended in an aqueous solution of manganese chloride ($\rho_2$=1.098 g/cm$^3$, $\chi_2$=1.7×10$^{-4}$) filled in a test tube of diameter of 2 cm. The size of each pellet was ca. 5×5×5 mm$^3$. Since the densities of these pellets were higher than that of the supporting solution, they were sinking at the bottom of the test tube in the beginning. Then, when the test tube was moved from above the magnetic center, each pellet was levitated at different locations as shown in FIG. 3.

Example 3

The Example 3 is based on Examples 1 and 2. Theoretical consideration shows that a spatial resolution can be made larger. Combined with this enhanced resolution, a continuous separation method at a large scale becomes possible.

Let us consider the area in which the left-hand side of Equation (1) is expressed as a×z+b. The spatial resolution $\Delta z$ between two plastic particles having difference $\Delta(\Delta\rho/\Delta\chi)$ is expressed as $$\Delta z = a^{-1}\mu_o g \Delta(\Delta\rho/\Delta\chi).$$

If the quantity a is sufficiently small, the resolution could be as large as several meters. A continuous apparatus shown in FIG. 4 makes it possible to separate a plastic mixture to its constituent components continuously.

A characteristic feature of the separation method proposed in the present invention is summarized as follows: Under a magnetic field gradient, solid plastic particles floating and sinking in a suporting liquid, most suitably in a paraniagnetic one, are levitated at different locations depending on their densities and diamagnetic susceptibilities, resulting in a separation.

What is claimed is:

1. A method for separating different kinds of solid plastic particles in a solid plastic mixture, which comprises the steps of:

preparing a solid plastic mixture comprising plural kinds of diamagnetic solid plastic particles having different compositions from each other, floating, suspending or precipitating said solid plastic particles in an aqueous solution of paramagnetic inorganic salt as a supporting liquid, applying a magnetic field gradient to the solid plastic mixture, and levitating or anti-levitating said plastic particles at different locations in the supporting liquid under the magnetic field gradient, depending upon their densities and diamagnetic susceptibilities of the plastic particles.

2. The method claimed in claim 1, wherein the separation is continuously carried out by circulating the suspending liquid.

* * * * *